(12) United States Patent
Ecrement

(10) Patent No.: US 9,019,413 B2
(45) Date of Patent: Apr. 28, 2015

(54) METHOD OF IMAGE PREVIEW IN A DIGITAL IMAGE PICKUP APPARATUS

(75) Inventor: Philippe Ecrement, Oyeu (FR)

(73) Assignee: STMicroelectronics (Grenoble 2) SAS, Grenoble (FR)

( * ) Notice: Subject to any disclaimer, the term of this patent is extended or adjusted under 35 U.S.C. 154(b) by 80 days.

(21) Appl. No.: 13/559,404

(22) Filed: Jul. 26, 2012

(65) Prior Publication Data

US 2013/0033615 A1 Feb. 7, 2013

(30) Foreign Application Priority Data

Aug. 2, 2011 (FR) ...................................... 11 57086

(51) Int. Cl.
*H04N 5/232* (2006.01)
*H04N 5/272* (2006.01)

(52) U.S. Cl.
CPC ........... *H04N 5/23293* (2013.01); *H04N 5/272* (2013.01)

(58) Field of Classification Search
CPC ....................... H04N 5/23219; H04N 5/23293
USPC .............. 348/333.01, 333.02, 333.05, 333.11
See application file for complete search history.

(56) References Cited

U.S. PATENT DOCUMENTS 6,665,015 B1 * 12/2003 Watanabe et al. ............. 348/362
8,711,265 B2 * 4/2014 Kawamura et al. ....... 348/333.02
2001/0012072 A1 8/2001 Ueno
2005/0128333 A1 6/2005 Park et al.
2005/0134719 A1 6/2005 Beck
2008/0239132 A1 10/2008 Kohama
2008/0240563 A1 * 10/2008 Takano et al. ................. 382/173
2009/0009652 A1 * 1/2009 Sudo et al. .................... 348/349
2009/0022427 A1 * 1/2009 Park et al. ..................... 382/298
2009/0237523 A1 9/2009 Date et al.
2009/0244354 A1 * 10/2009 Sakaguchi ............... 348/333.02
2010/0013977 A1 1/2010 Suzuki
2010/0289937 A1 * 11/2010 Hada ........................ 348/333.01

FOREIGN PATENT DOCUMENTS

JP 2010279051 A 12/2010

* cited by examiner

*Primary Examiner* — Timothy J Henn
(74) *Attorney, Agent, or Firm* — Seed IP Law Group PLLC

(57) ABSTRACT

The present disclosure relates to a method of image preview in an image pickup apparatus. One embodiment is directed to a method that includes acquiring from an image sensor an image of a scene observed by an image sensor of the apparatus, generating a preview image obtained by applying to the acquired image a resolution reduction process to adapt it to the resolution of a display screen of a viewfinder of the image pickup apparatus, displaying the preview image on the display screen, generating an image of an area of the scene by extracting an area from the acquired image, and displaying the area image superimposed on the preview image or alternately with the preview image, the area image displayed having a resolution higher than that of the preview image and inferior or equal to that of the acquired image.

19 Claims, 3 Drawing Sheets

METHOD OF IMAGE PREVIEW IN A DIGITAL IMAGE PICKUP APPARATUS

BACKGROUND

1. Technical Field

The present invention relates to image preview in an image pickup apparatus such as a still picture camera or a video camera.

2. Description of the Related Art

To allow the user to center the image coming from the image sensor on a scene, image pickup apparatuses are equipped with an optical or electronic viewfinder. The present disclosure more particularly applies to image pickup apparatuses equipped with electronic viewfinders.

Electronic viewfinders comprise a display screen of relatively small dimensions and low resolution with respect to that of the apparatus image sensor. This display allows the user to view the image coming from the image sensor before saving an image or a sequence of images in full resolution, such as those provided by the image sensor.

To display an image coming from the image sensor on the viewfinder's display screen, the image is subjected to several processes in particular to adapt its resolution to that of the viewfinder's display screen. These processes often cause a reduction, even a suppression, of some defects of the image, like clarity defects and noise defects, which appear in particular in the presence of low lighting. These defects which are small or not visible on the viewfinder's display screen, become visible at printing or displaying an image saved at the resolution of the image sensor, for example on a display screen of bigger dimensions. Thus, the viewfinder of an image pickup apparatus does not always allow the defects of images to be viewed before saving, so that it is hard, and in some cases, even impossible for the user to adjust accurately enough some image pickup parameters like the image sensor sensitivity or the lens focus.

The user may admittedly make several attempts, each attempt consisting in saving an image and viewing a part of the saved image in zoom mode on the viewfinder screen. This method appears inappropriate to take a brief scene, and very tedious, in particular with some image pickup apparatuses comprising a complex control interface to allow numerous image pickup parameters to be adjusted. In addition, a correct adjustment of image pickup parameters often results from a tradeoff between several parameters. Furthermore, such an adjustment may be adapted to a situation, but disastrous in other situations. The user must therefore adjust these parameters to each scene.

Some image pickup apparatuses have a simplified control interface comprising several image pickup modes, each adapted to a particular situation, and each corresponding to a set of predefined setting values of the image pickup parameters. Some apparatuses also offer an automatic selection of an image pickup mode. However, these solutions cannot take into account all the possible image pickup situations.

Some more advanced apparatuses offer to automatically set all the adjustable image pickup parameters by performing an analysis of the image directly supplied by the image sensor. However, the setting algorithms used cannot be adapted to some types of scenes, and do not offer a setting as accurate as that resulting from user evaluation.

BRIEF SUMMARY

One embodiment of the present disclosure allows the user to accurately adjust image pickup parameters in an image pickup apparatus without requiring triggering the saving of an image or a sequence of images. One embodiment of the present disclosure allows the user to immediately view in the viewfinder the effect of the setting of an image pickup parameter, like the image sensor sensitivity, the lens focus or the image sharpness, the final level of noise, etc.

Embodiments relate to a method of image preview in an image pickup apparatus. In one embodiment, the method includes acquiring from an image sensor an image of a scene observed by an image sensor of the apparatus, generating a preview image obtained by applying to the acquired image a resolution reduction process to adapt it to the resolution of a display screen of a viewfinder of the image pickup apparatus, displaying the preview image on the display screen, generating an image of an area of the scene by extracting an area from the acquired image, and displaying the area image superimposed on the preview image or alternately with the preview image, the area image displayed having a resolution higher than that of the preview image and inferior or equal to that of the acquired image.

According to an embodiment, generating the preview image and the area image are simultaneous.

According to an embodiment, the method comprises several simultaneous steps of generating area images of the scene, each area image being extracted from an area of the acquired image.

According to an embodiment, the method comprises adjusting the position in the acquired image, and/or the shape, and/or the dimensions of the image area, and/or adjusting the position and resolution of each area image on the preview image.

According to an embodiment, the method comprises capturing an area image, and displaying the captured area image on the preview image.

According to an embodiment, the method comprises applying noise reduction and outline enhancement processes to each area image.

According to an embodiment, the method comprises successive steps of capturing several area images, each captured area image being captured in association with image pickup parameter values implemented to obtain the acquired image from which the area image is extracted, and a step of implementing image pickup parameter values corresponding to a captured area image, selected by the user, to acquire a new image of the scene observed by the image sensor.

Embodiments also relate to an image pickup apparatus comprising an image sensor and a display screen of viewfinder, configured to implement the method as previously defined.

According to an embodiment, the apparatus comprises a process chain for generating from an acquired image a preview image obtained by applying to the acquired image a resolution reduction process to adapt it to the resolution of a viewfinder display screen of the image pickup apparatus, and a process chain for generating an image of an area of the scene obtained by extracting an area from the acquired image having a resolution higher than that of the preview image and inferior or equal to that of the acquired image.

According to an embodiment, the apparatus comprises several process chains, each for generating an image of an area of the scene obtained by extracting an area from the acquired image having a resolution higher than that of the preview image and inferior or equal to that of the acquired image.

According to an embodiment, the apparatus comprises control buttons and/or a transparent touch control panel arranged on the display screen to adjust the position in the acquired image, and/or the shape, and/or the dimensions of the area, and/or adjusting the position on the preview image of each area image.

According to an embodiment, the apparatus comprises a control button for triggering the capturing of an area image and displaying the captured area image on the preview image, each process chain to generate an image of an area being configured to capturize the generated area image.

According to an embodiment, the apparatus is configured to capturize an area image in association with image pickup parameter values implemented to obtain the acquired image from which the area image is extracted, and implement the captured image pickup parameter values, upon selection by the user of the area image, to acquire a new image of the scene observed by the image sensor.

BRIEF DESCRIPTION OF THE SEVERAL VIEWS OF THE DRAWINGS

Embodiments of the disclosure will be described hereinafter, in relation with, but not limited to the appended figures wherein.

DETAILED DESCRIPTION

Figure 1:
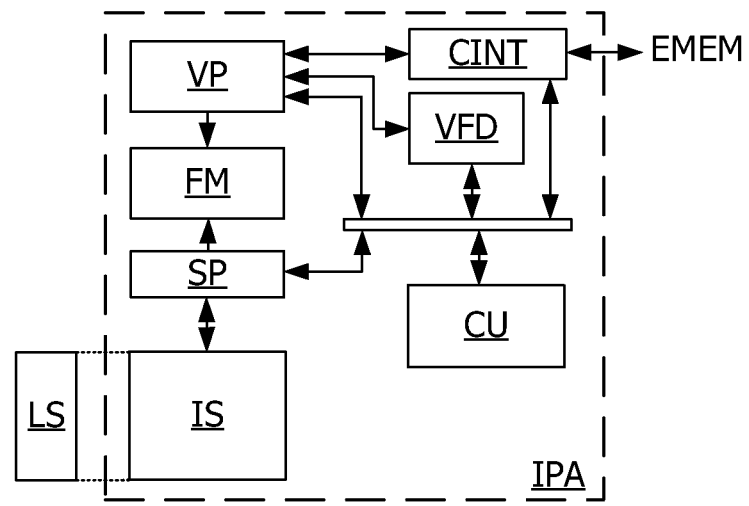
FIG. 1 schematically shows circuits of an image pickup apparatus.

FIG. 1 shows circuits of an image pickup apparatus IPA, such as a still picture camera or a video camera. The apparatus IPA comprises an image sensor IS associated with a lens LS. The sensor IS is coupled to a signal processor SP which drives the sensor IS and generates image data from the signals supplied by the sensor IS. The processor SP stores the image data obtained in a frame memory FM. The apparatus IPA also comprises a video processor VP, which processes the image data in the memory FM and supplies images to a viewfinder VFD display screen and an interface circuit CINT to transmit them outside the apparatus IPA, for example to an external storage memory EMEM or to an external display screen. The processors SP, VP, the viewfinder VFD and the circuit CINT are controlled by a control unit CU, for example made from a microcontroller.

The processor SP drives the sensor IS and performs a series of preprocesses, such as gain adjustment and analog-to-digital conversion of the signals coming from the sensor to convert them into pixel digital signals, which are stored in the memory FM. The processor VP performs pixel signal correction processes and possibly image or video format conversion processes.

Figure 2:
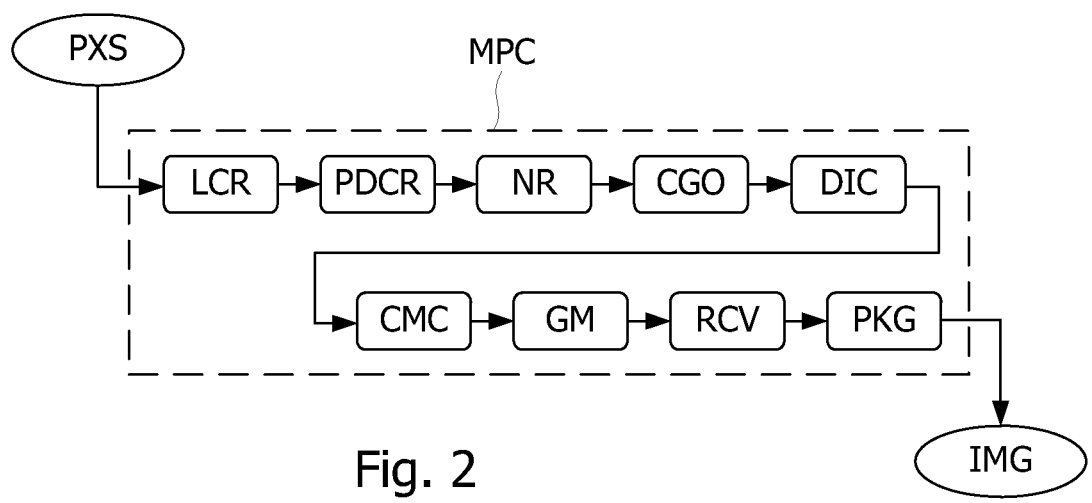
FIG. 2 schematically shows a process chain of an image pickup apparatus.

FIG. 2 shows in greater details an example of main processing chain MPC implemented by the processor VP. In FIG. 2, the chain MPC processes the pixel data of an image PXS and supplies an image IMG which can be displayed on a display screen or stored in memory. The chain MPC may comprise in particular:
 an optical defect correction module LCR for correcting the optical defects introduced by the lens LS,
 a pixel defect correction module PDCR for correcting the effects of pixels detected faulty for example at the end of the sensor IS manufacture,
 a noise reduction module NR,
 a gain correction and signal offset module CGO,
 a color interpolation module DIC for interpolating a RGB (Red Green Blue) color filter array,
 a color correction matrix module CMC,
 a gamma correction module GM,
 possibly a video format conversion module RCV, and
 an outline enhancement module PKG for enhancing the outlines detected in the image.

The chain MPC may also comprise modules for correcting the white balance and for correcting the sensor IS exposure. The order of the modules previously mentioned in the chain MPC affects the quality of the final image IMG. Admittedly, the processes previously described to generate the image IMG may be performed in another order than the order indicated in FIG. 2. In addition, if the sensor IS does not comprise any color filters, i.e., is monochrome, the processes on the colors may be replaced by processes on pixel intensity dynamics.

Figure 3:
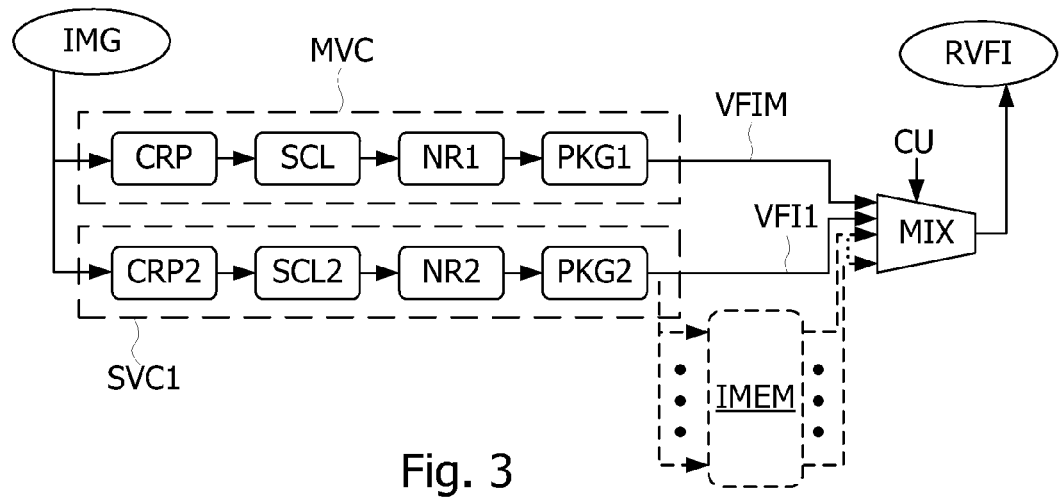
FIG. 3 schematically shows image process chains adapted to supply an image to an electronic viewfinder, according to one embodiment.

FIG. 3 shows a chain of processes MVC applied by the processor VP to the image IMG coming from the process chain MPC, to produce an image that can be displayed on the screen of the viewfinder VFD. The chain MVC comprises scaling modules SCL, and possibly cropping CRP, noise reduction NR1, and outline enhancement PKG1 modules. The module SCL allows the image IMG resolution to be reduced to adapt it to that of the screen VFD. The chain MVC supplies a preview image VFIM susceptible of being displayed by the screen VFD and which may have a framing of the scene observed by the sensor IS substantially identical to that of the image IMG.

According to one embodiment, the processor VP comprises another process chain SVC1 to process the image IMG in parallel with the chain MSCV. The chain SVC1 is configured to generate from the image IMG another image VFI1 to be displayed on the screen of the viewfinder VFD, which is combined with the image VFIM by an image mixer module MIX. The module MIX provides an image RVFI which is displayed on the screen VFD. The circuit MIX is configured to display the image VFI1 superimposed on the image VFIM.

According to one embodiment, the process chain SVC1 is configured to extract an area of the image IMG to display it without scaling process, i.e., without resolution reduction, or with a lower resolution reduction with respect to that performed by the module SCL. This arrangement allows the user to view the effects on an area of the final image IMG of the image pickup parameter settings, in particular the image sharpness, as well as the noise present in the image. To that end, the process chain SVC1 comprises cropping modules CRP2, and possibly scaling SCL2, noise reduction NR2 and outline enhancement PKG2 modules. The order of the modules NR2 and PKG2 may be different than shown, including inverted, although noise reduction should be performed before outline enhancement, to avoid also enhancing the noise present in the image IMG. The module CRP2 makes it possible to extract the area of the image IMG to be displayed. The chain SVC1 may comprise other image process modules which do not affect the user visual perception, in particular as far as clarity sharpness and noise are concerned.

Figure 4:
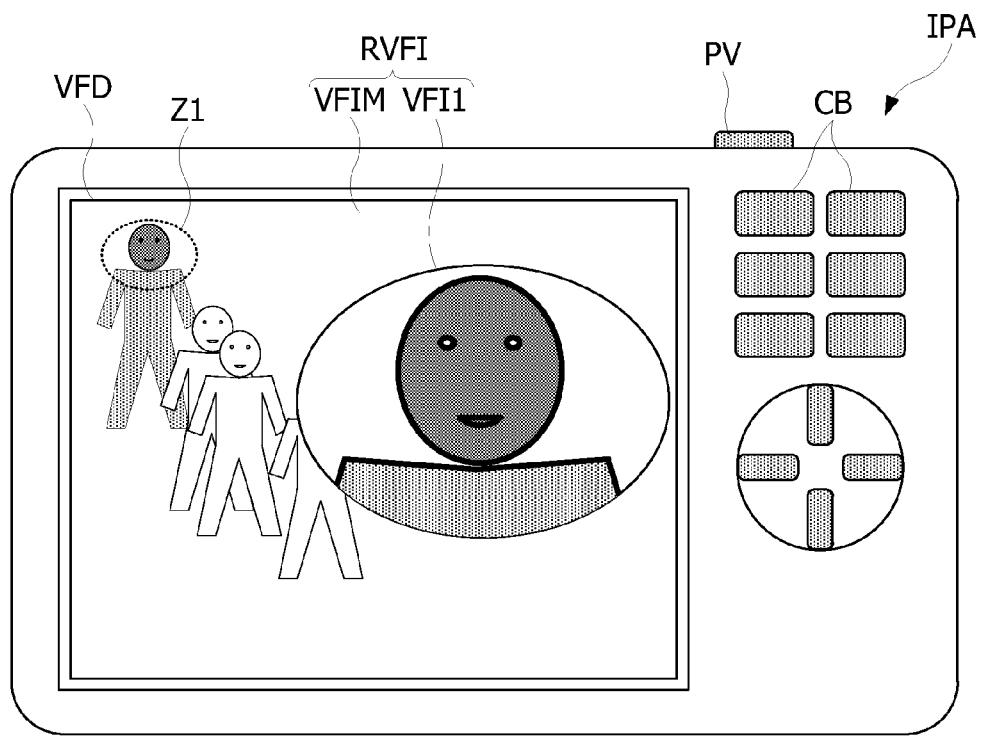
FIG. 4 schematically shows a face of an image pickup apparatus comprising the display screen of an electronic viewfinder.

FIG. 4 shows a rear face of the apparatus IPA where the display screen VFD is visible. This apparatus face also comprises control buttons CB allowing in particular the image RVFI displayed on the screen VFD to be defined. The circuit MIX provides the screen VFD with the image RVFI resulting from the image VFI1 representing an area Z1 of the image IMG, supplied by the chain SVC1, superimposed on the image VFIM corresponding to the image IMG whose resolution has been adapted to be entirely displayed on the screen VFD. In the example of FIG. 4, the image VFI1 has been obtained by extracting the area Z1 from the image IMG and by not applying thereto any resolution reduction process. That way, the user may view the area Z1 of the image IMG such that it will be captured if the user decides to trigger the image pickup by pressing an image pickup triggering button PV provided to that end on the apparatus IPA.

According to one embodiment, the shape, dimensions and position in the image IMG of the area Z1 may be modified by the unit CU which is controlled to that end using the buttons CB, and/or a transparent control touch panel arranged on the screen VFD. To that end, the outline of the area Z1 in the image VFIM may be displayed on the screen VFD on the image VFIM. Admittedly, the shape of the area Z1 is not limited to the elliptic shape given as an example in FIG. 4. The area Z1 may have any shape, such as a rectangular or circular shape. The area Z1 may also be enlarged within the limit fixed by the dimensions of the screen VFD. When the image VFI1 of the area Z1 occupies the whole surface of the screen VFD, one of the control buttons CB may be configured to select the image to be displayed among the images VFIM and VFI1. The module MIX is also controlled by the circuit CU to modify the position and dimensions (scaling) of the image VFI1 on the image VFIM in the image RVFI displayed on the screen VFD.

To display the area Z1, an advanced preview mode may be activated by the user. When this mode is activated, the apparatus IPA displays specific noise and clarity setting commands on the screen DSP. The result of these settings may not be visible on the image VFIM, but is visible and evaluated on the image VFI1.

According to one embodiment, the chain SVC1 may comprise an image memorization module IMEM to capture one or more images VFI1 supplied by the chain SVC1. One of the control buttons CB is provided to allow the user to trigger the capturing of the image VFI1 supplied by the chain SVC1 when pressing the control button. Each image VFI1 captured by the module IMEM is transmitted to the module MIX to be displayed on the screen VFD, on the image VFIM. The user may then separately move the images VFI1 displayed on the screen VFD, in particular to be able to simultaneously view them when they are superimposed. The user may thus keep an image VFI1 obtained with a certain configuration of the image pickup setting parameters. Capturing one or more images VFI1 then allows the user to compare on two or more images VFI1, the effects on the final image IMG of different configurations of image pickup setting parameters.

According to one embodiment, each image VFI1 is captured in association with the image pickup parameter values implemented to obtain the image IMG from which the image VFI1 is extracted. In addition, the control buttons CB may be configured to allow the user, by selecting on the screen VFD one of the images VFI1 captured, to implement in the main chain MPC all the parameter values captured in association with the selected image VFI1. That way, the user may, by simply selecting a captured image, select the image pickup parameter values of the captured image VFI1, which seems the best to him/her, and apply these values to obtain an image IMG to be captured.

Figure 5:
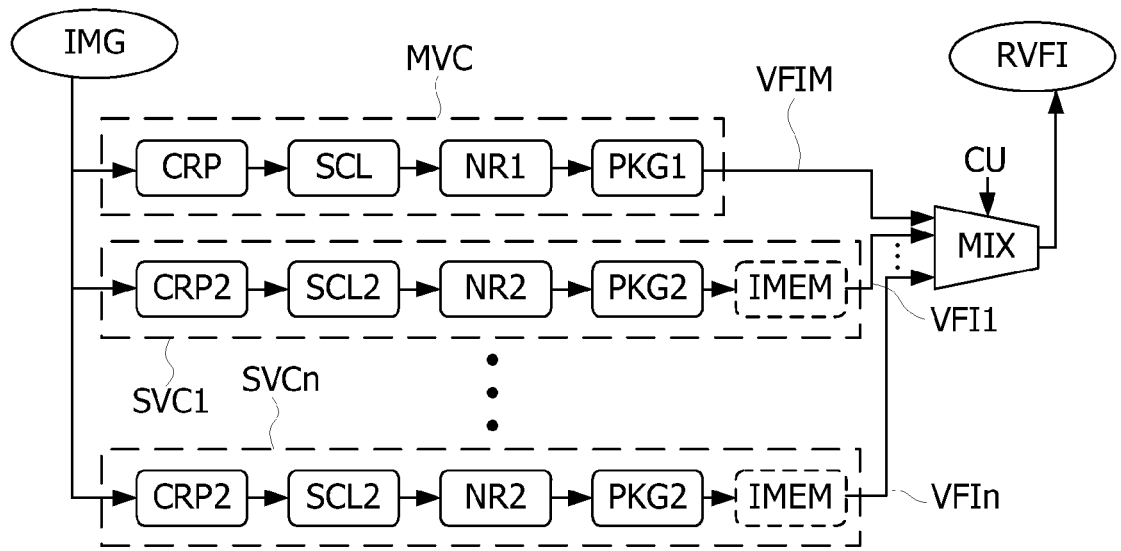
FIG. 5 schematically shows image process chains adapted to supply an image to an electronic viewfinder, according to another embodiment.

According to one embodiment shown in FIG. 5, the processor VP implements several process chains in parallel with the chain MVC. Thus, FIG. 5 shows the chain MVC and several parallel process chains SVC1-SVCn. Each chain SVC1-SVCn receives the image IMG, and generates from this image an image VFI1-VFIn of an area (Z1) of the image IMG, to be displayed on the image VFIM, simultaneously. The images VFI1-VFIn may refer to areas of the image IMG which may be identical or different. All the chains SVC1-SVCn may be identical to the chain SVC1 shown in FIG. 3 or different. In one embodiment, the processes applied to the image IMG by each chain SVC1-SVCn may be separately configured by the user. Each chain SVC1-SVCn comprises at least one cropping module CRP2 which may be configured by the user, as far as the shape, dimensions and position in the image IMG of the area of this image, processed by the chain SVC1-SVCn are concerned.

Each chain SVC1-SVCn may also comprise a memorization module IMEM to freeze the image VFI1-VFIn supplied by the chain on the screen VFD.

Figure 6:
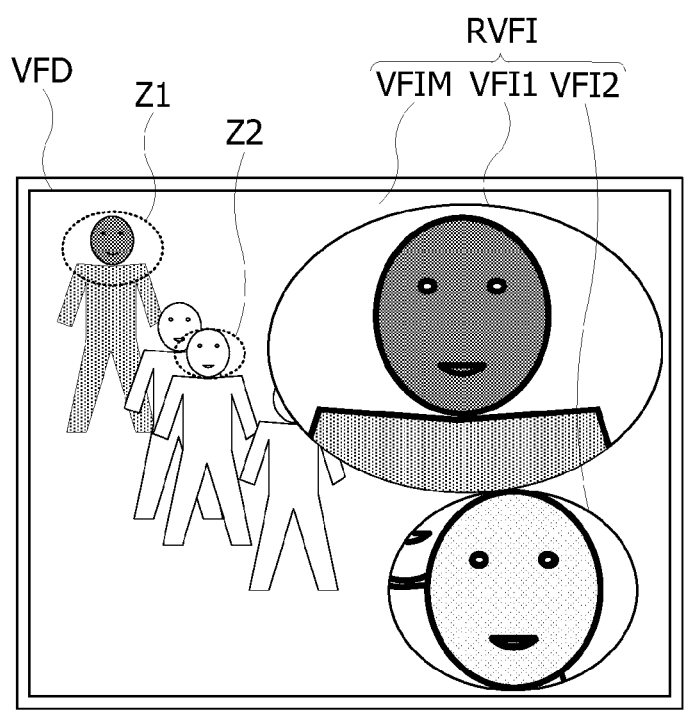
FIG. 6 schematically shows an image displayed by the viewfinder display screen, according to one embodiment.

FIG. 6 shows an image RVFI displayed by the viewfinder VFD. In the example of FIG. 6, the image RVFI comprises the image VFIM on which the images VFI1 and VFI2 of areas Z1 and Z2, extracted from the image IMG, are displayed. In the example of FIG. 6, the sizes of the areas Z1, Z2 differ, but are shown in the images VFI1, VFI2 with a same resolution.

It will be clear to those skilled in the art that the present disclosure is susceptible of various embodiments and applications. In particular, the embodiments are not limited to a method in which the steps of generating the images VFIM and VFI1-VFIn are simultaneously performed. Indeed, given the computing power of current image process processors, it is quite conceivable that the generation processes of these images are performed successively, without it being disturbing for the user.

In addition, it is clear that only the scaling process to generate the image VFIM and the cropping process to generate the images VFI1-VFIn are necessary, the other processes are used in particular to improve the visual quality of these images. It is also clear that the images VFI1-VFIn may be subjected to a scaling process (resolution reduction) lower than that applied to the image VFIM, upon request of the user, to reduce their dimensions in the image VFIM displayed on the screen DSP.

The invention is not limited either to the various embodiments previously described, but also includes the possible combinations of these embodiments.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method comprising:
    acquiring, from an image sensor of an image pickup apparatus having a display screen, a plurality of images, each of the plurality of images being taken with a plural set of image pickup parameter values, respectively, of the image pickup apparatus, the image pickup parameter values including two or more of lens focus, image sensor sensitivity, and image sharpness;

generating a preview image for at least one of the acquired images by applying a resolution reduction process to adapt the acquired image to the resolution of the display screen of the image pickup apparatus;

displaying the at least one preview image on the display screen;

generating a plurality of area images by extracting substantially same areas from the acquired images, respectively, the area images having a resolution that is higher than a resolution of the preview image and inferior or equal to the resolution of the respective acquired image, each generated area image being associated with the respective set of image pickup parameter values that were used when acquiring the respective image from which the area image is extracted;

displaying the plurality of area images and the at least one preview image on the display screen;

in response to receiving a user selection, setting the image pickup apparatus to have the set of image pickup parameter values of the selected area image; and acquiring a new image using the image pickup apparatus operating with the set of image pickup parameter values.

2. The method of claim 1, wherein the preview image and one of the area images are simultaneously generated.

3. The method of claim 1, wherein each area image is extracted from a different acquired image.

4. The method of claim 1, comprising adjusting at least one of the portion of the scene in the area image, a shape of the area image, and dimensions of the image area.

5. The method of claim 1, wherein displaying the plurality of area images and the preview image comprises superimposing the plurality of area images on the preview image.

6. The method of claim 1, comprising applying noise reduction and outline enhancement to the plurality of area images.

7. The method of claim 1, comprising adjusting at least one of position and resolution of one of the area images displayed on the display screen.

8. An image pickup apparatus comprising:
an image sensor configured to acquire a plurality of images each having a first resolution;
a video processor coupled to the image sensor and configured to:
receive image data associated with each of the acquired images;
associate each image with a plural set of image pickup parameter values used by the image pickup apparatus when the acquired image was acquired; and
generate preview images from the image data, the preview images having a lower resolution than the first resolution of the acquired images; and
extract a portion of the image data and generate a plurality of area images of substantially a same portion of the image data, the plurality of area images having a resolution that is higher than the resolution of the preview images and lower than or equal to the first resolution of the acquired images; and
a display screen coupled to the video processor and configured to display one of the preview images and the plurality of area images.

9. The apparatus of claim 8, wherein the video processor is configured to apply a resolution reduction process to the acquired images to adapt the acquired images to the resolution of the display screen of the image pickup apparatus.

10. The apparatus of claim 8, wherein the video processor is configured to extract a plurality of portions of the image data to generate a plurality of area images, each area image having a resolution higher than the resolution of the preview image and inferior or equal to the first resolution of the acquired image.

11. The apparatus of claim 8, comprising a user interface configured to adjust at least one of size, shape, dimensions, and locations of the plurality of area images.

12. The apparatus of claim 8, wherein the display screen is configured to display the plurality of area images superimposed on the preview image.

13. The apparatus of claim 12, comprising a user interface that when activated triggers the acquiring of the plurality of area images and the displaying the area image superimposed on the preview image.

14. The apparatus of claim 8, wherein the video processor is configured to implement the set image pickup parameter values, in response to a selection by one of the displayed area images, to acquire a new image by the image sensor.

15. The apparatus of claim 8, wherein video processor is configured to generate the preview image at approximately the same time as one of the area images.

16. The apparatus of claim 8, comprising a memory coupled to the image processor and configured to store the image data associated with the acquired images.

17. An article of manufacture including a non-transitory computer-readable medium having instructions stored thereon that, in response to execution by a computing device, cause the computing device to perform a method comprising:
acquiring images, each image having a first resolution and taken with a plural set of image pickup parameter values of the image pickup apparatus;
generating a preview image for at least one of the acquired images, the preview image having a second resolution, the second resolution being lower than the first resolution;
generating area images, each including a substantially same portion of the acquired images, respectively, the area image having a third resolution, the third resolution being equal to or less than the first resolution and greater than the second resolution;
displaying the area images and the preview image on a display screen; and
adjusting the image pickup parameter values in response to one of the area images being selected, wherein the image pickup parameter values are adjusted to correspond to the set if image area parameter values used to take the selected area image.

18. The article of manufacture of claim 17, wherein the method includes displaying the area images superimposed on the preview image.

19. The article of manufacture of claim 17, wherein generating the preview image occurs concurrently with generating the preview image.

* * * * *